No. 868,654.
PATENTED OCT. 22, 1907.
R. H. GOLDSBOROUGH.
TURBINE.
APPLICATION FILED JAN. 29, 1907.
5 SHEETS—SHEET 1.
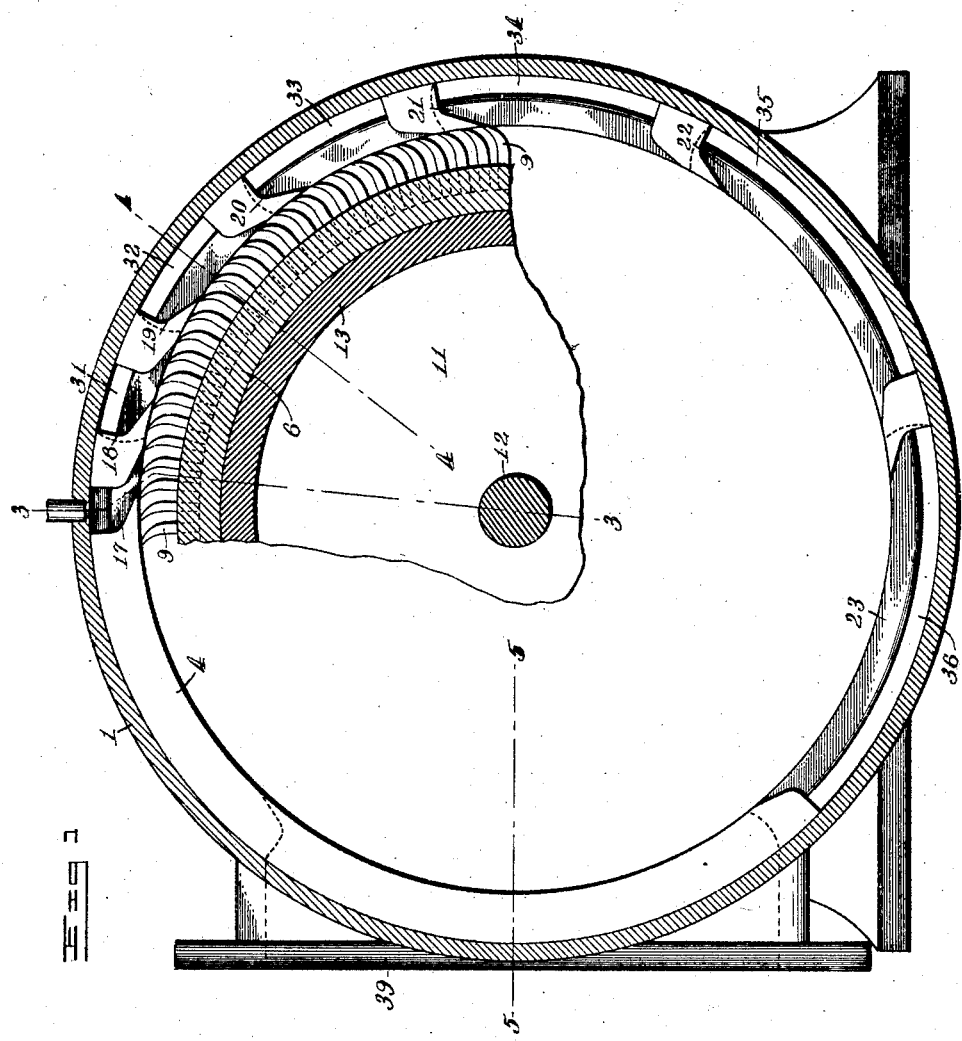
Witnesses
Inventor
Richard H. Goldsborough
By
Attorney No. 868,654. PATENTED OCT. 22, 1907.
R. H. GOLDSBOROUGH.
TURBINE.
APPLICATION FILED JAN. 29, 1907.
5 SHEETS—SHEET 2.
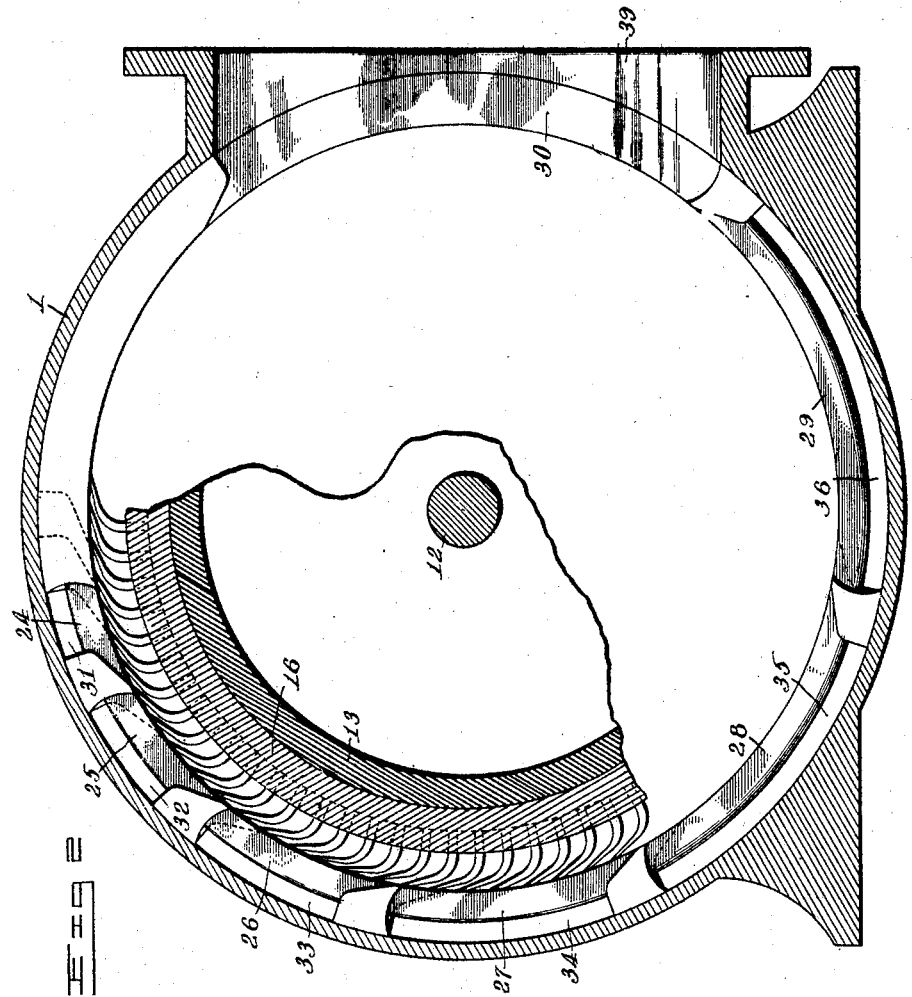
Witnesses
Inventor
Richard H. Goldsborough
By
Attorney

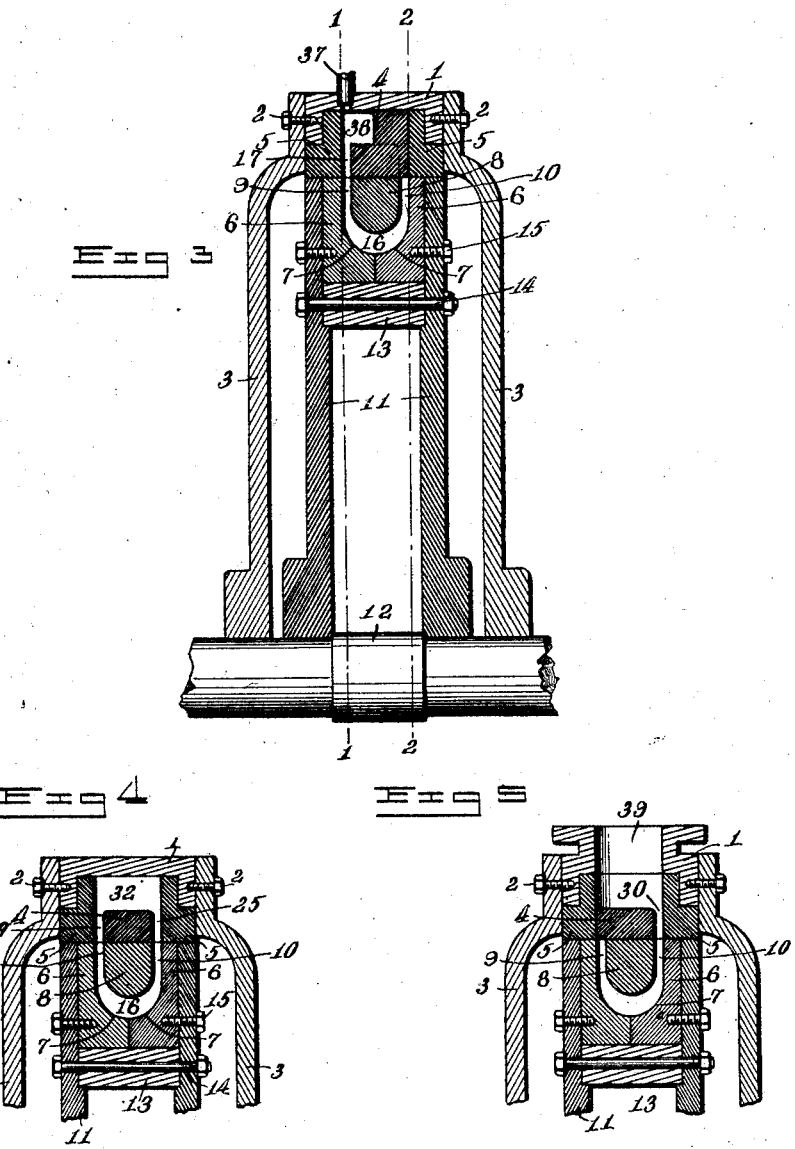

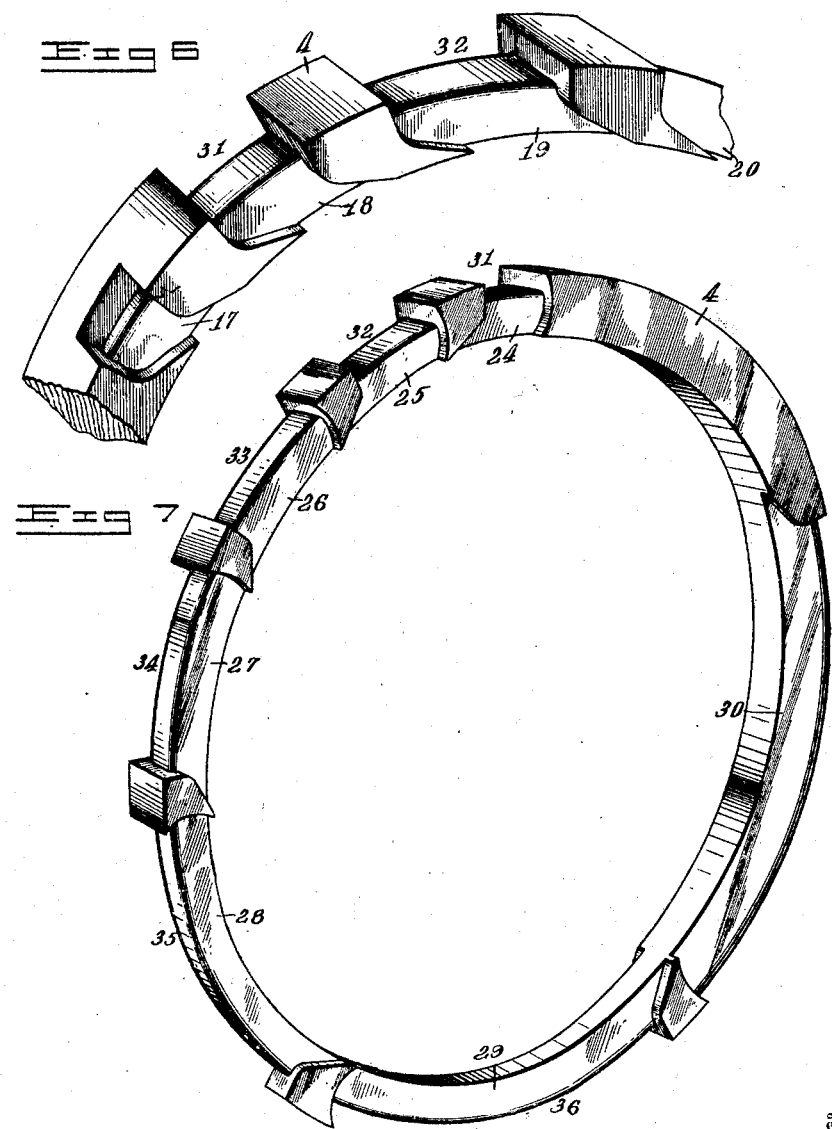

No. 868,654. PATENTED OCT. 22, 1907.
R. H. GOLDSBOROUGH.
TURBINE.
APPLICATION FILED JAN. 29, 1907.
5 SHEETS—SHEET 5.
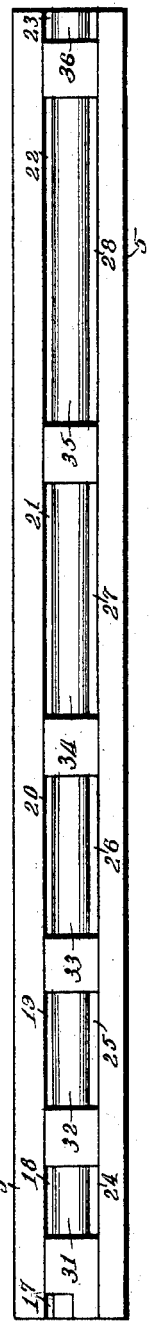
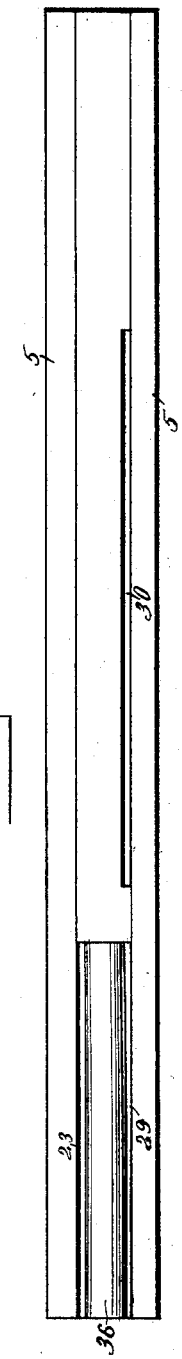
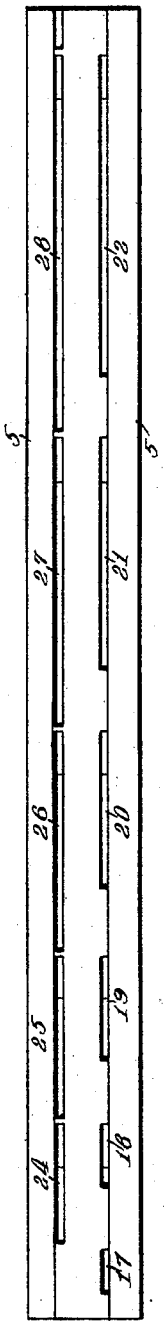
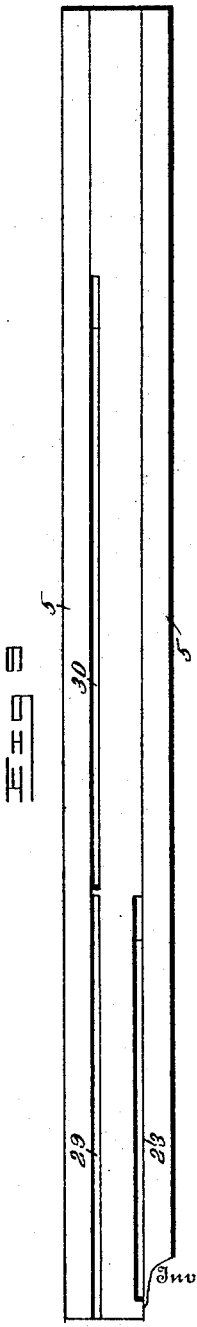
Witnesses
H. A. Robinette
E. A. Panabaker
Inventor
Richard H. Goldsborough
By G. Ayres
Attorney

UNITED STATES PATENT OFFICE.

RICHARD H. GOLDSBOROUGH, OF WASHINGTON, DISTRICT OF COLUMBIA.

TURBINE.

No. 868,654.　　　　Specification of Letters Patent.　　　　Patented Oct. 22, 1907.

Application filed January 29, 1907. Serial No. 354,675.

*To all whom it may concern:*

Be it known that I, RICHARD H. GOLDSBOROUGH, a citizen of the United States, residing at Washington, District of Columbia, have invented certain new and useful Improvements in Turbines, of which the following is a specification.

My invention relates to improvements in turbines, and it consists in the constructions, combinations and arrangements herein described and claimed.

An object of my invention is to provide compact turbine constructions capable of operation with an advantageously small rotor clearance, and adapted to furnish large power with a high degree of efficiency.

A further object of my invention is to provide a compound turbine in which a large portion of the periphery of the annular series of rotor vanes is occupied by ports, thereby minimizing the losses due to the fan-work of idle vanes and to the leakage resulting from spill between the several vanes of the series.

A further object of my invention is to provide a compound turbine in which the actuating medium is conducted in a helical path and repeatedly directed through the vanes by a series of jets of progressively decreased velocity at successive points along its path; whereby excessive pitch of the helical path can be avoided and the pitch maintained constant, if desired.

In the accompanying drawings, forming a part of this application and in which similar reference symbols indicate corresponding parts in the several views—

Figure 1 is a sectional view, with a portion of the rotor broken away, through the annular series of admission ports, taken on the line 1—1, of Fig. 3, and illustrating one embodiment of my invention; Fig. 2 is a similar view through the annular series of exhaust ports, taken on the line 2—2, of Fig. 3; Fig. 3 is a sectional view on the line 3—3, of Fig. 1, taken in the plane of the initial admission port; Fig. 4 is a detail sectional view, on the line 4—4, of Fig. 1, taken through an intermediate admission port; Fig. 5 is a detail sectional view on the line 5—5, of Fig. 1, taken through the final exhaust port; Fig. 6 is a perspective view of a portion of the port ring, clearly illustrating the arrangement of the admission ports; Fig. 7 is a perspective view of the port ring showing the exhaust-port side thereof; Fig. 8 is a development of the outer periphery of the port ring and the annular closure plates at each side thereof; and Fig. 9 is a similar development of the inner periphery of the port ring and closure plates.

Referring to the drawings, 1 indicates a turbine casing suitably secured, as by a series of bolts 2, to two casing heads 3; a port ring 4 and side closure rings 5 being supported within said casing and heads. An annular series of substantially U-shaped vanes is clamped between two annular blocks 6, which latter are provided with coöperating recesses 7 corresponding to the outer contour of the vanes; a central division and clamping ring 8 extending around the annular series of vanes between the admission legs 9 and discharge legs 10 of the several vanes. If desired, the recesses of the annular blocks 6 may be provided with relatively soft seats for permitting slight impression of the vanes therein, and the division ring 8 may be channeled to receive the edges of the vanes in engagement therewith.

Rotor disks 11, secured to the turbine shaft 12, carry an annular spacing member 13 whose outer periphery constitutes a seat for the annular blocks 6. The spacing member 13 and block 6 are clamped between the rotor disks 11 by a series of bolts 14; suitable means, such as bolts 15, being provided for preventing shifting of the rings 5.

The U-shaped reversing vanes comprise admission legs 9, of mainly kinetic type, and discharge legs 10, of mainly pressure type, connected by a portion 16 of increased width; under certain conditions, it is found advisable to construct the connection portion 16 with a slight rearward inclination, thereby causing the entire length of the U-shaped vane to constitute an active vane. This construction causes a reduction of velocity and regeneration of pressure in the actuating medium during its deflection while passing from the admission legs to the discharge legs of the vanes; thereby minimizing the vane friction of the actuating medium and efficiently augmenting the action of both the admission and discharge legs.

The port ring 4 is provided on its respective sides with a series of admission ports 17 to 23 and a corresponding series of discharge ports 24 to 30. The successive ports of each series are shown having a uniform depth, and a progressively increased peripheral width to accommodate the expansion of the actuating medium during its flow through the series. A series of recesses 31 to 36, extending perpendicularly across the outer periphery of the port ring 4, constitute chambers which connect the outer end of each exhaust port with the outer end of the next succeeding admission port.

As shown especially in Figs. 6 and 7, the admission and exhaust ports and their connecting recesses are preferably machined, or otherwise formed, in the port ring 4; the open sides of the ports being closed by the laterally arranged closure plates 5. Copper gaskets, or other suitable packing, can be conveniently interposed between the port ring and closure plates, if desired. This provides a very compact and inexpensive construction, which will be maintained perfectly steam-tight under all conditions of operation. The inner ends of the several exhaust ports are arranged to occupy substantially a continuous portion of the periphery of the annular series of discharge legs of the rotor vanes, and the inner ends of the admission ports are uniformly spaced about a corresponding portion of the periphery of the annular series of admission legs of said vanes. By this arrangement, the progressively increased angular advance of the successive exhaust ports relative to the next preceding admission ports, necessitated by the progressively decreased velocity of the actuating medium in the successive admission ports, is effectively provided for by the increase in the peripheral dimensions of the successive ports of the series. Further, the close and uniform spacing of the ports about the periphery of the rotor minimizes the distortion of the parts under the action of varying temperatures, and permits the employment of a very efficiently small rotor clearance.

In the operation of my invention, the steam, or other actuating medium, is conducted by a main supply pipe 37 under suitable pressure to a steam chest 38. The initial admission port 17, leading from the steam chest 38, directs the steam at an efficient angle against the admission legs of the rotor vanes, from which it is deflected past the vane portion 16 to the corresponding discharge legs; a slight regeneration of the steam pressure being produced during its passage from the admission to the discharge legs. After thus following a substantially U-shaped path through the vanes, the steam is peripherally discharged into the first exhaust port 24, from which it is conducted by the recess 31 perpendicularly across the outer periphery of the port ring to the outer end of the next succeeding admission port 18. The admission port 18 directs the steam again through the rotor vanes, from which it is discharged into the next succeeding exhaust port 25. From the exhaust port 25, the steam is conducted perpendicularly across the outer periphery of the port ring, to the outer end of the next succeeding admission port 19; and the above described steps are repeated until the steam passes through the several successive ports of the series and is exhausted through the final discharge port 30. The turbine casing is shown provided with a discharge conduit 39 for leading the final exhaust from the port 30 to any suitable point, such as the atmosphere or a condenser.

The several ports and their connecting chambers are suitably proportioned to produce a progressively decreased velocity of the steam flow in the successive admission ports of the series; the velocity of the steam being preferably finally reduced as low as practicable without causing a defective brake action of the steam in the last stages. It will be noted that, by conducting the steam perpendicularly across the port ring from each exhaust port to the next succeeding admission port, the length of the helical path of the steam will be minimized, thereby lessening all danger of loss through dissipation of heat or leakage. Further, the steam is always deflected in the same direction during its passage through the port ring, thereby assuring an efficient distribution of pressure and minimizing losses incident to skin and fluid friction.

From the above description, it will be seen that my invention provides an inexpensive and compact form of compound turbine, capable of furnishing large power with a high degree of efficiency, and in which the defects inherent in existing constructions are minimized in a simple and efficient manner.

I have illustrated and described a preferred and satisfactory form, but, obviously, changes could be made within the spirit and scope of my invention.

Having thus described my invention, what I claim as new and desire to secure by Letters Patent is:

1. In a compound turbine, the combination of a rotor, an annular series of substantially U-shaped reversing vanes carried thereby, said vanes comprising admission legs and discharge legs extending to the periphery of said rotor and a connection of increased width between the inner ends of said legs, and means surrounding the outer periphery of the annular series of admission legs for repeatedly directing an actuating medium thereto in a successive series of jets of progressively decreased velocity, substantially as described.

2. In a compound turbine, the combination of a rotor, an annular series of substantially U-shaped reversing vanes carried thereby, said vanes comprising admission legs and discharge legs extending to the periphery of said rotor and a connection of increased width between the inner ends of said legs, a series of exhaust ports extending substantially continuously along the periphery of said annular series of discharge legs, a corresponding series of admission ports spaced along the periphery of said annular series of admission legs, and chambers connecting the outer ends of the several exhaust ports with the outer ends of the next succeeding admission ports, substantially as described.

3. In a compound turbine, the combination of a rotor, an annular series of substantially U-shaped reversing vanes carried thereby, said vanes provided with admission legs and discharge legs extending to the periphery of said rotor, a port ring provided with recesses extending perpendicularly across its outer periphery and with a series of admission ports and exhaust ports on its respective sides extending forwardly from said recesses, substantially as described.

4. In a compound turbine, the combination of a rotor, an annular series of substantially U-shaped reversing vanes carried thereby, said vanes provided with admission legs and discharge legs extending to the periphery of said rotor, a port ring surrounding the outer periphery of said rotor and provided with a series of admission and discharge ports on its respective sides, and with recesses extending perpendicularly across its outer periphery for connecting the outer ends of the several exhaust ports with the outer ends of the next succeeding admission ports, substantially as described.

5. In a compound turbine, the combination of a rotor, an annular series of substantially U-shaped reversing vanes carried thereby, said vanes provided with admission legs and discharge legs extending to the periphery of said rotor, a port ring surrounding the outer periphery of said rotor, a series of exhaust ports on one side of said ring, arranged with their inner ends extending substantially continuously along the periphery of said annular series of discharge legs, a corresponding series of admission ports on the other side of said ring with their inner ends uniformly spaced along the periphery of said annular series of admission legs, and chambers connecting the outer ends of the several exhaust ports with the outer ends of the next succeeding admission ports, substantially as described.

6. In a compound turbine, the combination of a rotor, an annular series of substantially U-shaped reversing vanes carried thereby, said vanes provided with admission legs and discharge legs extending to the periphery of said rotor, a port ring surrounding the outer periphery of said rotor and provided with recesses in its respective sides to constitute a series of admission ports and exhaust ports, and laterally arranged closure plates for closing the sides of said port recesses, substantially as described.

In testimony whereof I affix my signature in presence of two witnesses.

RICHARD H. GOLDSBOROUGH.

Witnesses:
G. AYRES,
H. A. ROBINETTE.